(12) United States Patent
Guéziec et al.

(10) Patent No.: US 8,619,072 B2
(45) Date of Patent: Dec. 31, 2013

(54) CONTROLLING A THREE-DIMENSIONAL VIRTUAL BROADCAST PRESENTATION

(75) Inventors: André Guéziec, Campbell, CA (US); Briac Blanquart, Campbell, CA (US)

(73) Assignee: Triangle Software LLC, Campbell, CA (US)

( * ) Notice: Subject to any disclaimer, the term of this patent is extended or adjusted under 35 U.S.C. 154(b) by 641 days.

(21) Appl. No.: 12/398,120

(22) Filed: Mar. 4, 2009

(65) Prior Publication Data
US 2010/0225643 A1    Sep. 9, 2010

(51) Int. Cl.
*G06T 19/00* (2011.01)
*G06F 3/0346* (2013.01)
*G01W 1/10* (2006.01)

(52) U.S. Cl.
USPC .............................. 345/419; 345/158; 702/3

(58) Field of Classification Search
None
See application file for complete search history.

(56) References Cited

U.S. PATENT DOCUMENTS

| | | |
|---|---|---|
| 4,734,863 A | 3/1988 | Honey et al. |
| 4,788,645 A | 11/1988 | Zavoli et al. |
| 4,792,803 A | 12/1988 | Madnick et al. |
| 4,796,191 A | 1/1989 | Honey et al. |
| 4,878,170 A | 10/1989 | Zeevi |
| 4,914,605 A | 4/1990 | Loughmiller, Jr. et al. |
| 4,926,343 A | 5/1990 | Tsuruta et al. |
| 5,068,656 A | 11/1991 | Sutherland |
| 5,095,532 A | 3/1992 | Mardus |
| 5,126,941 A | 6/1992 | Gurmu et al. |
| 5,164,904 A | 11/1992 | Sumner |
| 5,173,691 A | 12/1992 | Sumner |
| 5,182,555 A | 1/1993 | Sumner |
| 5,220,507 A | 6/1993 | Kirson |
| 5,247,439 A | 9/1993 | Gurmu et al. |
| 5,262,775 A | 11/1993 | Tamai et al. |
| 5,276,785 A | 1/1994 | Mackinlay et al. |

(Continued)

FOREIGN PATENT DOCUMENTS

DE    19856704 A1    6/2001
EP    0 749 103    12/1996

(Continued)

OTHER PUBLICATIONS

WSI, "TrueView Interactive Training Manual, Showfx Student Guide", Print Date: Sep. 2004, Documentation Version: 4.3x. Link: http://apollo.lsc.vsc.edu/intranet/WSI_Showfx/training/970-TVSK-SG-43.pdf.*

(Continued)

*Primary Examiner* — Kee M Tung
*Assistant Examiner* — Sing-Wai Wu
(74) *Attorney, Agent, or Firm* — Lewis Roca Rothgerber LLP

(57) ABSTRACT

Control of a three-dimensional virtual broadcast presentation is disclosed. The three-dimensional virtual broadcast presentation may be generated based on dynamic information such as traffic information, weather information, or other information that may be featured on a three-dimensional virtual broadcast presentation. A signal generated by a control device maneuvered by a presenter and reflecting positional information of the control device is received. A view of the three-dimensional virtual broadcast presentation is manipulated in response to the received signal, the manipulation of the virtual broadcast presentation at least partially based on positional information of the control device.

19 Claims, 6 Drawing Sheets

(56) References Cited

U.S. PATENT DOCUMENTS

| | | |
|---|---|---|
| 5,283,575 A | 2/1994 | Kao et al. |
| 5,291,412 A | 3/1994 | Tamai et al. |
| 5,291,413 A | 3/1994 | Tamai et al. |
| 5,291,414 A | 3/1994 | Tamai et al. |
| 5,297,028 A | 3/1994 | Ishikawa |
| 5,297,049 A | 3/1994 | Gurmu et al. |
| 5,303,159 A | 4/1994 | Tamai et al. |
| 5,311,195 A | 5/1994 | Mathis et al. |
| 5,311,434 A | 5/1994 | Tamai |
| 5,339,246 A | 8/1994 | Kao |
| 5,343,400 A | 8/1994 | Ishikawa |
| 5,345,382 A | 9/1994 | Kao |
| 5,359,529 A | 10/1994 | Snider |
| 5,374,933 A | 12/1994 | Kao |
| 5,377,113 A | 12/1994 | Shibazaki et al. |
| 5,390,123 A | 2/1995 | Ishikawa |
| 5,394,333 A | 2/1995 | Kao |
| 5,402,120 A | 3/1995 | Fujii et al. |
| 5,414,630 A | 5/1995 | Oshizawa et al. |
| 5,428,545 A | 6/1995 | Maegawa et al. |
| 5,430,655 A | 7/1995 | Adachi |
| 5,440,484 A | 8/1995 | Kao |
| 5,465,079 A | 11/1995 | Bouchard et al. |
| 5,477,220 A | 12/1995 | Ishikawa |
| 5,485,161 A | 1/1996 | Vaughn |
| 5,488,559 A | 1/1996 | Seymour |
| 5,499,182 A | 3/1996 | Ousborne |
| 5,508,931 A | 4/1996 | Snider |
| 5,515,283 A | 5/1996 | Desai |
| 5,515,284 A | 5/1996 | Abe |
| 5,539,645 A | 7/1996 | Mandhyan et al. |
| 5,546,107 A | 8/1996 | Deretsky et al. |
| 5,548,822 A | 8/1996 | Yogo |
| 5,550,538 A | 8/1996 | Fujii et al. |
| 5,554,845 A | 9/1996 | Russell |
| 5,583,972 A | 12/1996 | Miller |
| 5,608,635 A | 3/1997 | Tamai |
| 5,610,821 A | 3/1997 | Gazis et al. |
| 5,689,252 A | 11/1997 | Ayanoglu et al. |
| 5,694,534 A | 12/1997 | White, Jr. et al. |
| 5,699,056 A | 12/1997 | Yoshida |
| 5,706,503 A | 1/1998 | Poppen et al. |
| 5,712,788 A | 1/1998 | Liaw et al. |
| 5,729,458 A | 3/1998 | Poppen |
| 5,731,978 A | 3/1998 | Tamai et al. |
| 5,742,922 A | 4/1998 | Kim |
| 5,751,245 A | 5/1998 | Janky et al. |
| 5,751,246 A | 5/1998 | Hertel |
| 5,757,359 A | 5/1998 | Morimoto et al. |
| 5,774,827 A | 6/1998 | Smith et al. |
| 5,818,356 A | 10/1998 | Schuessler |
| 5,822,712 A | 10/1998 | Olsson |
| 5,845,227 A | 12/1998 | Peterson |
| 5,850,190 A | 12/1998 | Wicks et al. |
| 5,862,244 A | 1/1999 | Kleiner et al. |
| 5,862,509 A | 1/1999 | Desai et al. |
| 5,864,305 A | 1/1999 | Rosenquist |
| 5,867,110 A | 2/1999 | Naito et al. |
| 5,893,081 A | 4/1999 | Poppen |
| 5,893,898 A | 4/1999 | Tanimoto |
| 5,898,390 A | 4/1999 | Oshizawa et al. |
| 5,902,350 A | 5/1999 | Tamai et al. |
| 5,904,728 A | 5/1999 | Tamai et al. |
| 5,908,464 A | 6/1999 | Kishigami et al. |
| 5,910,177 A | 6/1999 | Zuber |
| 5,911,773 A | 6/1999 | Mutsuga et al. |
| 5,912,635 A | 6/1999 | Oshizawa et al. |
| 5,916,299 A | 6/1999 | Poppen |
| 5,922,042 A | 7/1999 | Sekine et al. |
| 5,928,307 A | 7/1999 | Oshizawa et al. |
| 5,931,888 A | 8/1999 | Hiyokawa |
| 5,933,100 A | 8/1999 | Golding |
| 5,938,720 A | 8/1999 | Tamai |
| 5,948,043 A | 9/1999 | Mathis et al. |
| 5,978,730 A | 11/1999 | Poppen et al. |
| 5,982,298 A | 11/1999 | Lappenbusch et al. |
| 5,987,381 A | 11/1999 | Oshizawa et al. |
| 5,991,687 A | 11/1999 | Hale et al. |
| 5,999,882 A | 12/1999 | Simpson et al. |
| 6,009,374 A | 12/1999 | Urahashi |
| 6,011,494 A | 1/2000 | Watanabe et al. |
| 6,016,485 A | 1/2000 | Amakawa et al. |
| 6,021,406 A | 2/2000 | Kuznetsov |
| 6,038,509 A | 3/2000 | Poppen et al. |
| 6,058,390 A | 5/2000 | Liaw et al. |
| 6,064,970 A | 5/2000 | McMillan et al. |
| 6,091,359 A | 7/2000 | Geier |
| 6,091,956 A | 7/2000 | Hollenberg |
| 6,097,399 A | 8/2000 | Bhatt et al. |
| 6,111,521 A | 8/2000 | Mulder et al. |
| 6,144,919 A | 11/2000 | Ceylan et al. |
| 6,150,961 A | 11/2000 | Alewine et al. |
| 6,161,092 A | 12/2000 | Latshaw et al. |
| 6,169,552 B1 | 1/2001 | Endo et al. |
| 6,188,956 B1 | 2/2001 | Walters |
| 6,209,026 B1 | 3/2001 | Ran et al. |
| 6,222,485 B1 | 4/2001 | Walters et al. |
| 6,236,933 B1 | 5/2001 | Lang |
| 6,253,146 B1 | 6/2001 | Hanson et al. |
| 6,253,154 B1 | 6/2001 | Oshizawa et al. |
| 6,256,577 B1 | 7/2001 | Granuke |
| 6,259,987 B1 | 7/2001 | Ceylan et al. |
| 6,282,486 B1 | 8/2001 | Bates et al. |
| 6,282,496 B1 | 8/2001 | Chowdhary |
| 6,292,745 B1 | 9/2001 | Robare et al. |
| 6,295,492 B1 | 9/2001 | Lang et al. |
| 6,297,748 B1 | 10/2001 | Lappenbusch et al. |
| 6,298,305 B1 | 10/2001 | Kadaba et al. |
| 6,317,685 B1 | 11/2001 | Kozak et al. |
| 6,317,686 B1 | 11/2001 | Ran |
| 6,335,765 B1 | 1/2002 | Daly et al. |
| 6,353,795 B1 | 3/2002 | Ranjan |
| 6,356,836 B1 | 3/2002 | Adolph |
| 6,360,165 B1 | 3/2002 | Chowdhary |
| 6,362,778 B2 | 3/2002 | Neher |
| 6,415,291 B2 | 7/2002 | Bouve et al. |
| 6,424,910 B1 | 7/2002 | Ohler et al. |
| 6,456,931 B1 | 9/2002 | Polidi et al. |
| 6,456,935 B1 | 9/2002 | Ng |
| 6,463,400 B1 | 10/2002 | Barkley-Yeung |
| 6,466,862 B1 | 10/2002 | DeKock et al. |
| 6,470,268 B1 | 10/2002 | Ashcraft et al. |
| 6,473,000 B1 | 10/2002 | Secreet et al. |
| 6,480,783 B1 | 11/2002 | Myr |
| 6,504,541 B1 | 1/2003 | Liu et al. |
| 6,529,143 B2 | 3/2003 | Mikkola et al. |
| 6,532,304 B1 | 3/2003 | Liu et al. |
| 6,539,302 B1 | 3/2003 | Bender et al. |
| 6,542,814 B2 | 4/2003 | Polidi et al. |
| 6,552,656 B2 | 4/2003 | Polidi et al. |
| 6,556,905 B1 | 4/2003 | Mittlesteadt et al. |
| 6,559,865 B1 | 5/2003 | Angwin |
| 6,574,548 B2 | 6/2003 | DeKock et al. |
| 6,584,400 B2 | 6/2003 | Beardsworth |
| 6,594,576 B2 | 7/2003 | Fan et al. |
| 6,598,016 B1 | 7/2003 | Zavoli et al. |
| 6,600,994 B1 | 7/2003 | Polidi |
| 6,603,405 B2 | 8/2003 | Smith |
| 6,622,086 B2 | 9/2003 | Polidi |
| 6,643,581 B2 | 11/2003 | Ooishi |
| 6,650,997 B2 | 11/2003 | Funk |
| 6,675,085 B2 | 1/2004 | Straub |
| 6,681,176 B2 | 1/2004 | Funk et al. |
| 6,687,615 B1 | 2/2004 | Krull et al. |
| 6,700,503 B2 | 3/2004 | Masar et al. |
| 6,710,774 B1 | 3/2004 | Kawasaki et al. |
| 6,720,889 B2 | 4/2004 | Yamaki et al. |
| 6,728,605 B2 | 4/2004 | Lash et al. |
| 6,728,628 B2 | 4/2004 | Peterson |
| 6,731,940 B1 | 5/2004 | Nagendran |
| 6,735,516 B1 | 5/2004 | Manson |
| 6,754,833 B1 | 6/2004 | Black et al. |
| 6,785,606 B2 | 8/2004 | DeKock et al. |
| 6,791,472 B1 | 9/2004 | Hoffberg |

(56) References Cited

U.S. PATENT DOCUMENTS

| | | | |
|---|---|---|---|
| 6,807,483 B1 | 10/2004 | Chao et al. | |
| 6,845,316 B2 | 1/2005 | Yates | |
| 6,862,524 B1 | 3/2005 | Nagda et al. | |
| RE38,724 E | 4/2005 | Peterson | |
| 6,885,937 B1 | 4/2005 | Sunranyi | |
| 6,901,330 B1 | 5/2005 | Krull et al. | |
| 6,914,541 B1 | 7/2005 | Zierden | |
| 6,922,629 B2 | 7/2005 | Yoshikawa et al. | |
| 6,931,309 B2 | 8/2005 | Phelan et al. | |
| 6,952,643 B2 | 10/2005 | Matsuoka et al. | |
| 6,965,665 B2 | 11/2005 | Fan et al. | |
| 6,983,204 B2 | 1/2006 | Knutson | |
| 6,987,964 B2 | 1/2006 | Obradovich et al. | |
| 6,989,765 B2 | 1/2006 | Gueziec | |
| 6,999,873 B1 | 2/2006 | Krull et al. | |
| 7,010,583 B1 | 3/2006 | Aizono et al. | |
| 7,062,378 B2 | 6/2006 | Krull et al. | |
| 7,069,143 B2 | 6/2006 | Peterson | |
| 7,103,854 B2 | 9/2006 | Fuchs et al. | |
| 7,161,497 B2 | 1/2007 | Gueziec | |
| 7,221,287 B2 | 5/2007 | Gueziec | |
| 7,343,242 B2 | 3/2008 | Breitenberger et al. | |
| 7,356,392 B2 | 4/2008 | Hubbard et al. | |
| 7,375,649 B2 | 5/2008 | Gueziec | |
| 7,424,388 B2 | 9/2008 | Sato | |
| 7,433,676 B2 | 10/2008 | Kobayashi et al. | |
| 7,440,842 B1 | 10/2008 | Vorona | |
| 7,486,201 B2 | 2/2009 | Kelly et al. | |
| 7,508,321 B2 | 3/2009 | Gueziec | |
| 7,557,730 B2 | 7/2009 | Gueziec | |
| 7,558,674 B1* | 7/2009 | Neilley et al. | 702/3 |
| 7,603,138 B2 | 10/2009 | Zhang et al. | |
| 7,610,145 B2 | 10/2009 | Kantarjiev et al. | |
| 7,613,564 B2 | 11/2009 | Vorona | |
| 7,634,352 B2 | 12/2009 | Soulchin et al. | |
| 7,702,452 B2 | 4/2010 | Kantarjiev et al. | |
| 7,792,642 B1 | 9/2010 | Neiley et al. | |
| 7,880,642 B2 | 2/2011 | Gueziec | |
| 7,908,076 B2 | 3/2011 | Downs et al. | |
| 7,912,627 B2 | 3/2011 | Downs et al. | |
| 8,103,443 B2 | 1/2012 | Kantarjiev et al. | |
| 8,358,222 B2 | 1/2013 | Gueziec | |
| 8,531,312 B2 | 9/2013 | Gueziec | |
| 8,537,033 B2 | 9/2013 | Gueziec | |
| 8,564,455 B2 | 10/2013 | Gueziec | |
| 2001/0014848 A1 | 8/2001 | Walgers et al. | |
| 2001/0018628 A1 | 8/2001 | Jenkins et al. | |
| 2001/0026276 A1 | 10/2001 | Sakamoto et al. | |
| 2001/0033225 A1 | 10/2001 | Razavi et al. | |
| 2001/0047242 A1 | 11/2001 | Ohta | |
| 2002/0042819 A1 | 4/2002 | Reichert et al. | |
| 2002/0077748 A1 | 6/2002 | Nakano | |
| 2002/0152020 A1 | 10/2002 | Seibel | |
| 2002/0177947 A1 | 11/2002 | Cayford | |
| 2003/0046158 A1 | 3/2003 | Kratky | |
| 2003/0109985 A1 | 6/2003 | Kotzin | |
| 2003/0135304 A1 | 7/2003 | Sroub et al. | |
| 2003/0182052 A1 | 9/2003 | DeLorme et al. | |
| 2004/0034464 A1 | 2/2004 | Yoshikawa et al. | |
| 2004/0046759 A1 | 3/2004 | Soulchin et al. | |
| 2004/0049424 A1 | 3/2004 | Murray et al. | |
| 2004/0080624 A1 | 4/2004 | Yuen | |
| 2004/0107288 A1 | 6/2004 | Menninger et al. | |
| 2004/0143385 A1 | 7/2004 | Smyth et al. | |
| 2004/0225437 A1 | 11/2004 | Endo et al. | |
| 2004/0249568 A1 | 12/2004 | Endo et al. | |
| 2005/0021225 A1 | 1/2005 | Kantarjiev et al. | |
| 2005/0027436 A1 | 2/2005 | Yoshikawa et al. | |
| 2005/0143902 A1* | 6/2005 | Soulchin et al. | 701/117 |
| 2005/0154505 A1 | 7/2005 | Nakamura et al. | |
| 2006/0122846 A1 | 6/2006 | Burr et al. | |
| 2006/0143959 A1 | 7/2006 | Stehle et al. | |
| 2006/0145892 A1 | 7/2006 | Gueziec | |
| 2006/0158330 A1 | 7/2006 | Gueziec | |
| 2006/0238521 A1 | 10/2006 | Westerman et al. | |
| 2006/0284766 A1 | 12/2006 | Gruchala et al. | |
| 2007/0013551 A1 | 1/2007 | Gueziec | |
| 2007/0060384 A1 | 3/2007 | Dohta | |
| 2007/0066394 A1 | 3/2007 | Ikeda et al. | |
| 2007/0197217 A1 | 8/2007 | Sutardja | |
| 2007/0208495 A1 | 9/2007 | Chapman et al. | |
| 2007/0208496 A1 | 9/2007 | Downs et al. | |
| 2007/0211026 A1 | 9/2007 | Ohta | |
| 2007/0211027 A1 | 9/2007 | Ohta | |
| 2007/0222750 A1* | 9/2007 | Ohta | 345/158 |
| 2007/0247291 A1 | 10/2007 | Masuda et al. | |
| 2007/0265766 A1 | 11/2007 | Jung et al. | |
| 2008/0071465 A1 | 3/2008 | Chapman et al. | |
| 2008/0084385 A1 | 4/2008 | Ranta et al. | |
| 2008/0133120 A1 | 6/2008 | Romanick | |
| 2008/0255754 A1 | 10/2008 | Pinto | |
| 2008/0297488 A1 | 12/2008 | Operowsky et al. | |
| 2009/0005965 A1 | 1/2009 | Forstall et al. | |
| 2009/0061971 A1 | 3/2009 | Weitzner et al. | |
| 2009/0066495 A1 | 3/2009 | Newhouse et al. | |
| 2009/0082950 A1 | 3/2009 | Vorona | |
| 2009/0112465 A1 | 4/2009 | Weiss et al. | |
| 2009/0118017 A1 | 5/2009 | Perlman et al. | |
| 2009/0118996 A1 | 5/2009 | Kantarjiev et al. | |
| 2009/0189979 A1* | 7/2009 | Smyth | 348/143 |
| 2009/0192702 A1 | 7/2009 | Bourne | |
| 2010/0094531 A1 | 4/2010 | MacLeod | |
| 2010/0100307 A1 | 4/2010 | Kim | |
| 2010/0145569 A1 | 6/2010 | Bourque et al. | |
| 2010/0145608 A1 | 6/2010 | Kurtti et al. | |
| 2010/0175006 A1 | 7/2010 | Li | |
| 2010/0198453 A1 | 8/2010 | Dorogusker et al. | |
| 2010/0305839 A1 | 12/2010 | Wenzel | |
| 2010/0312462 A1 | 12/2010 | Gueziec | |
| 2010/0333045 A1 | 12/2010 | Guziec | |
| 2011/0037619 A1 | 2/2011 | Ginsberg et al. | |
| 2011/0106427 A1 | 5/2011 | Kim et al. | |
| 2011/0304447 A1 | 12/2011 | Marumoto | |
| 2012/0123667 A1 | 5/2012 | Gueziec | |
| 2012/0150422 A1 | 6/2012 | Kantarjiev et al. | |
| 2012/0150425 A1 | 6/2012 | Chapman et al. | |
| 2012/0158275 A1 | 6/2012 | Huang et al. | |
| 2012/0290202 A1 | 11/2012 | Gueziec | |
| 2012/0290204 A1 | 11/2012 | Gueziec | |
| 2012/0296559 A1 | 11/2012 | Gueziec | |
| 2013/0033385 A1 | 2/2013 | Gueziec | |
| 2013/0204514 A1 | 8/2013 | Margulici | |
| 2013/0207817 A1 | 8/2013 | Gueziec | |
| 2013/0211701 A1 | 8/2013 | Baker et al. | |

FOREIGN PATENT DOCUMENTS

| | | |
|---|---|---|
| EP | 0 987 665 A2 | 3/2000 |
| EP | 1 006 367 | 6/2000 |
| GB | 2 400 293 | 10/2004 |
| JP | 05-313578 A | 11/1993 |
| JP | 08-77485 | 3/1996 |
| JP | 10-261188 A | 9/1998 |
| JP | 10-281782 A | 10/1998 |
| JP | 10-293533 A | 11/1998 |
| JP | 2000-055675 A | 2/2000 |
| JP | 2000-113387 A | 4/2000 |
| JP | 2001-330451 | 11/2001 |
| WO | WO 98/23018 | 5/1998 |
| WO | WO 00/50917 | 8/2000 |
| WO | 0188480 A1 | 11/2001 |
| WO | WO 02/77921 | 10/2002 |
| WO | 03014671 A1 | 2/2003 |
| WO | WO 2005/013063 | 2/2005 |
| WO | WO 2005/076031 | 8/2005 |
| WO | WO 2010/073053 | 7/2010 |
| WO | WO 2012/024694 | 2/2012 |
| WO | WO 2012/037287 | 3/2012 |
| WO | WO 2012/065188 | 5/2012 |
| WO | WO2012/159083 | 11/2012 |

OTHER PUBLICATIONS

12398120__ProposedExaminersAmendment__070213.*

(56) References Cited

OTHER PUBLICATIONS

Authorization_ExaminersAmendment_070313.*
Nintendo Wii Operations Manual Systems Setup, 2009.
Truett, R., "Car Navigation System May Live on After Test," The Orlando Sentinel, Feb. 17, 1993, p. 3 pages.
U.S. Dept. of Transportation, Closing the Data Gap: Guidelines for Quality Advanced Traveler Information System (ATIS) Data, Version 1.0, Sep. 2000, 41 pages.
Watanabe, M. et al., "Development and Evaluation of a Car Navigation System Providing a Bird's-Eye View Map Display," Technical Paper No. 961007, Feb. 1, 1996, pp. 11-18, SAE International.
Wischhof, L. et al., "SOTIS—A Self-Organizing Traffic Information System," Proceedings of the 57th IEEE Vehicular Technology Conference (VTC-'03), 2003, pp. 2442-2446, New York, NY, USA.
Yokouchi, K., "Car-Navigation Systems," Mitsubishi Electr. Adv. Technical Reports, 2000, vol. 91, pp. 10-14, Japan.
You, J. et al., "Development and Evaluation of a Hybrid Travel Time Forecasting Model," Transportation Research Part C 8, 2000, pp. 231-256, Pergamon Press Ltd., Elsevier Science Ltd., U.K.
Zhu, C. et al., "3D Terrain Visualization for Web GIS," Center for Advanced Media Technology, Nanyang Technological University, Singapore, 2003, 8 pages.
Audi-V150 Manual, Oct. 2001, 152 pages, Japan.
Birdview Navigation System by Nissan Motor Corp, 240 Landmarks of Japanese Automotive Technology, 1995, 2 pages, Society of Automotive Engineers of Japan, Inc., Japan.
Dancer, F. et al, "Vehicle Navigation Systems: Is America Ready?," Navigation and Intelligent Transportation Systems, Automotive Electronics Series, Society of Automotive Engineers, 1998, pp. Cover page, Table of Contents, pp. 3-8.
Endo et al., "Development and Evaluation of a Car Navigation System Providing a Birds Eye View Map Display," Navigation and Intelligent Transportation Systems, Automotive Electronics Series, Society of Automotive Engineers, 1998, pp. Cover page, Table of Contents, pp. 19-22.
Panasonic Portable Navigation System User Manual for Products KX-GT30, KX-GT30X, and KX-GT30Z, Cover page, pp. 1-5, 132-147, End pages, Matsushita Denki Sangyo K.K., Fukuoka City, Japan [Date Unknown].
Inman, V.W. et al., "TravTek Global Evaluation and Executive Summary," Publication No. FHWA-RD-96-031, Mar. 1996, 104 pages, U.S. Department of Transportation, McLean, VA, USA.
Inman, V.W. et al., "TravTek Evaluation Rental and Local User Study," Publication No. FHWA-RD-96-028, Mar. 1996, 110 pages, U.S. Department of Transportation, McLean, VA, USA.
Vollmer, R., "Navigation Systems—Intelligent Co-Drivers with Knowledge of Road and Tourist Information," Navigation and Intelligent Transportation Systems, Automotive Electronics Series, Society of Automotive Engineers, 1998, pp. Cover page, Table of Contents, pp. 9-17.
Blumentritt, K. et al., "TravTek System Architecture Evaluation," Publication No. FHWA-RD-96-141, Jul. 1995, 504 pages, U.S. Department of Transportation, McLean, VA, USA.
Zhao, Y. "Vehicle Location and Navigation Systems," 1997, 370 pages, Arthech House, Inc., Norwood, MA, USA.
"TravTek Information and Services Center Policy/Procedures Manual," Feb. 1992, 133 pages, U.S. Department of Transportation, McLean, VA, USA.
N'FIT Xanavi, unknown date, 94 pages, Japan.
XM Radio Introduces Satellite Update Service for Vehicle Navigation, Apr. 8, 2004, 2 pages.
Slothower, D., "Sketches & Applications," SIGGRAPH 2001, pp. 138-144, Stanford University.
Karbassi, A. et al., "Vehicle Route Prediction and Time of Arrival Estimation Techniques for Improved Transportation System Management," in Proceedings of the Intelligent Vehicles Symposium, 2003, pp. 511-516, IEEE, New York, NY, USA.
Koller, D. et al., "Virtual GIS: A Real-Time 3D Geographic Information System," Proceedings of the 6th IEEE Visualization Conference (Visualization '95) 1995, pp. 94-100, IEEE, New York, NY, USA.
Garmin International, Inc. and Garmin USA, Inc.'s Answer and Counterclaim to Triangle Software, LLC's Supplemental Complaint filed Jun. 17, 2011 in *Triangle Software, LLC* v. *Garmin International Inc.* et al., in the United States District Court for the Eastern District of Virginia, Alexandria Division, Case No. 1:10-cv-1457-CMH-TCB, 36 pages.
Initial Expert Report of William R. Michalson, Ph. D. dated Jun. 17, 2011 in *Triangle Software, LLC* v. *Garmin International Inc.* et al., in the United States District Court for the Eastern District of Virginia, Alexandria Division, Case No. 1:10-cv-1457-CMH-TCB, 198 pages.
Supplemental Expert Report of William R. Michalson, Ph. D. Regarding Invalidity of the Patents—in-Suit dated Jul. 5, 2011 in *Triangle Software, LLC* v. *Garmin International Inc.* et al., in the United States District Court for the Eastern District of Virginia, Alexandria Division, Case No. 1:10-cv-1457-CMH-TCB, 23 pages.
Initial Expert Report of Roy Summer dated Jun. 16, 2011 in *Triangle Software, LLC* v. *Garmin International Inc.* et al., in the United States District Court for the Eastern District of Virginia, Alexandria Division, Case No. 1:10-cv-1457-CMH-TCB, 289 pages.
Expert Report of Dr. Michael Goodchild Concerning the Validity of U.S. 5,938,720 dated Jun. 16, 2011 in *Triangle Software, LLC* v. *Garmin International Inc.* et al., in the United States District Court for the Eastern District of Virginia, Alexandria Division, Case No. 1:10-cv-1457-CMH-TCB, 16 pages.
Acura Debuts AcuraLink™ Satellite-Linked Communication System with Industry's First Standard Real Time Traffic Feature at New York International Auto Show, 2004, 4 pages.
Burgett, A. L.,"Safety Evaluation of TravTek," Vehicle Navigation & Information Systems Conference Proceedings (VNIS'91), P-253, Part 1, Oct. 1991, pp. 819-825, Soc. of Automotive Engineers, Inc., Warrendale, PA, USA.
de Cambray, B. "Three-Dimensional (3D) Modelling in a Geographical Database," Auto-Carto'11, Eleventh International Conference on Computer Assisted Cartography, Oct. 30, 1993-Nov. 1, 1993, pp. 338-347, Minneapolis, USA.
Campbell, J. L., "Development of Human Factors Design Guidelines for Advanced Traveler Information Systems (ATIS)", Proceedings Vehicle Navigation and Information Systems Conference, 1995, pp. 161-164, IEEE, New York, NY, USA.
Campbell, J. L., "Development of Human Factors Design Guidelines for Advanced Travel Information Systems (ATIS) and Commercial Vehicle Operations (CVO)", Publication No. FHWA-RD-98-057, Report Date Sep. 1998, 294, pages, U.S. Department of Transportation, McLean, VA 22010-2296.
Cathey, F.W. et al., "A Prescription for Transit Arrival/Departure Prediction Using Automatic Vehicle Location Data," Transportation Research Part C 11, 2003, pp. 241-264, Pergamon Press Ltd., Elsevier Ltd., U.K.
Chien, S. I. et al., "Predicting Travel Times for the South Jersey Real-Time Motorist Information System," Transportation Research Record 1855, Paper No. 03-2750, Revised Oct. 2001, pp. 32-40.
Chira-Chavala, T. et al. "Feasibility Study of Advanced Technology HOV Systems," vol. 3: Benefit Implications of Alternative Policies for Including HOV lanes in Route Guidance Networks, Dec. 1992, 84 pages, UCB-ITS-PRR-92-5 PATH Research Report, Inst. of Transportation Studies, Univ. of Calif., Berkeley, USA.
Clark. E.L., Development of Human Factors Guidelines for Advanced Traveler Information Systems (ATIS) and Commercial Vehicle Operations (CVO): Comparable Systems Analysis, Dec. 1996, 199 pages.
Davies, P. et al., "Assessment of Advanced Technologies for Relieving Urban Traffic Congestion," National Cooperative Highway Research Program Report 340, Dec. 1991, 106 pages.
Dillenburg, J.F. et al., "The Intelligent Travel Assistant," IEEE 5th International Conference on Intelligent Transportation Systems, Sep. 3-6, 2002, pp. 691-696, Singapore.
Dingus, T.A. et al., "Human Factors Engineering the TravTek Driver Interface," Vehicle Navigation & Information Systems Conference Proceedings (VNIS'91), P-253, Part 2, Oct. 1991, pp. 749-755, Soc. of Automotive Engineers, Inc., Warrendale, PA, USA.
Eppinger, A. et al., "Dynamic Route Guidance—Status and Trends," Convergence 2000 International Congress on Transportation Elec-

(56) References Cited

OTHER PUBLICATIONS tronics, Oct. 16-18, 1999, 7 pages, held in Detroit, MI, SAE International Paper Series, Warrendale, PA, USA.
Fleischman, R.N., "Research and Evaluation Plans for the TravTek IVHS Operational Field Test," Vehicle Navigation & Information Systems Conference Proceedings (VNIS'91), P-253, Part 2, Oct. 1991, pp. 827-837, Soc. of Automotive Engineers, Inc., Warrendale, PA, USA.
GM Exhibits Prototype of Travtek Test Vehicle, Inside IVHS, Oct. 28, 1991, V. 1, No. 21, 2 pages.
Golisch, F., Navigation and Telematics in Japan, International Symposium on Car Navigation Systems, May 21, 1997, 20 pages, held in Barcelona, Spain.
Gueziec, A., "Architecture of a System for Producing Animated Traffic Reports," Mar. 30, 2001, 42 pages.
Handley, S. et al., "Learning to Predict the Duration of an Automobile Trip," Proceedings of the Fourth International Conference on Knowledge Discovery and Data Mining, 1998, 5 pages, AAAI Press, New York, NY, USA.
Hirata et al., "The Development of a New Multi-AV System Incorporating an On-Board Navigation Function," International Congress and Exposition, Mar. 1-5, 1993, pp. 1-12, held in Detroit, MI, SAE International, Warrendale, PA, USA.
Hoffmann, G. et al., Travel Times as a Basic Part of the LISB Guidance Strategy, Third International Conference on Road Traffic Control, May 1-3, 1990, pp. 6-10, London, U.K.
Hofmann, T. "2005 Acura RL Prototype Preview," Auto123.com, 4 pages.
Hu, Z. et al., "Real-time Data Fusion on Tracking Camera Pose for Direct Visual Guidance," IEEE Vehicles Symposium, Jun. 14-17, 2004, pp. 842-847, held in Parma, Italy.
Hulse, M.C. et al., "Development of Human Factors Guidelines for Advanced Traveler Information Systems and Commercial Vehicle Operations: Identification of the Strengths and Weaknesses of Alternative Information Display Formats," Publication No. FHWA-RD-96-142, Oct. 16, 1998, 187 pages, Office of Safety and Traffic Operation R&D, Federal Highway Administration, USA.
Jiang, G., "Travel-Time Prediction for Urban Arterial Road: A Case on China," Proceedings Intelligent Transportation Systems, Oct 12-15, 2003, pp. 255-260, IEEE, New York, NY, USA.
Kopitz et al., Table of Contents, Chapter 6, Traffic Information Services, and Chapter 7, Intelligent Transport Systems and RDS-TMC in RDS: The Radio Data System, 1992, Cover page-XV, pp. 107-167, Back Cover page, Artech House Publishers, Boston, USA and London, Great Britain.
Krage, M.K., "The TravTek Driver Information System," Vehicle Navigation & Information Systems Conference Proceedings (VNIS'91), P-253, Part 1, Oct. 1991, pp. 739-748, Soc. of Automotive Engineers, Inc., Warrendale, PA, USA.
Ladner, R. et al., "3D Mapping of an Interactive Synthetic Environment," Computing Practices, Mar. 2000, pp. 33-39, IEEE, New York, NY, USA.
Lowenau, J. et al., "Final Map Actualisation Requirements," Version 1.1, ActMAP Consortium, Sep. 30, 2004, 111 pages.
Meridian Series of GPS Receivers User Manual, Magellan, 2002, 106 pages, Thales Navigation, Inc., San Dimas, CA, USA.
Ness, M. et al, "A Prototype Low Cost In-Vehicle Navigation System," IEEE—IEE Vehicle Navigation & Information Systems Conference (VNIS), 1993, pp. 56-59, New York, NY, USA.
Noonan J. et al., "Intelligent Transportation Systems Field Operational Test Cross-Cutting Study Advanced Traveler Information Systems," Sep. 1998, 27 pages, U.S. Department of Transportation, McLean, VA, USA.
Odagaki et al., Automobile Navigation System with Multi-Source Guide Information, International Congress & Exposition, Feb. 24-28, 1992, pp. 97-105, SAE Inernational,Warrendale, PA, USA.
Raper, J.F. et al., "Three-Dimensional GIS," in Geographical Information Systems: Principles and Applications, 1991, vol. 1, Chapter 20, 21 pages.
Reference Manual for the Magellan RoadMate 500/700, 2003, 65 pages, Thales Navigation, Inc., San Dimas, CA, USA.
Riiett, L.R., "Simulating the TravTek Route Guidance Logic Using the Integration Traffic Model," Vehicle Navigation & Information System, P-253, Part 2, Oct. 1991, pp. 775-787, Soc. of Automotive Engineers, Inc., Warrendale, PA, USA.
Rillings, J.H., et al., "TravTek," Vehicle Navigation & Information System Conference Proceedings (VNIS'91), P-253, Part 2, Oct. 1991, pp. 729-737, Soc. of Automotive Engineers, Inc., Warrendale, PA, USA.
Rupert, R.L., "The TravTek Traffic Management Center and Traffic Information Network," Vehicle Navigation & Information System Conference Proceedings (VNIS'91), P-253, Part 1, Oct. 1991, pp. 757-761, Soc. of Automotive Engineers, Inc., Warrendale, PA, USA.
Schofer, J. L., "Behavioral Issues in the Design and Evaluation of Advanced Traveler Information Systems," Transportation Research Part C 1, 1993, pp. 107-117, Pergamon Press Ltd., Elsevier Science Ltd.
Schulz, W., "Traffic Management Improvement by Integrating Modern Communication Systems," IEEE Communications Magazine, Oct. 1996, pp. 56-60, New York, NY, USA.
Shepherd, I.D.H. et al., "Information Integration and GIS," in Geographical Information Systems: Principles and Applications, 1991, vol. 1, pp. Cover page, 337-360, end page.
Sirius Satellite Radio: Traffic Development Kit Start Up Guide, Sep. 27, 2005, Version 00.00.01, NY, New York, 14 pages.
Sumner, R. "Data Fusion in Pathfinder and TravTek," Part 1, Vehicle Navigation & Information Systems Conference Proceedings (VNIS '91), Oct. 1991, Cover & Title page, pp. 71-75.
Tamura et al., "Toward Realization of VICS—Vehicle Information and Communications System," IEEE—IEE Vehicle Navigation & Information Systems Conference (VNIS 93),1993, pp. 72-77, held in Ottawa, Canada.
Taylor, K.B., "TrayTek—Information and Services Center," Vehicle Navigation & Information System Conference Proceedings (VNIS '91), P-253, Part 2, Oct. 1991, pp. 763-774, Soc. of Automotive Engineers, Inc., Warrendale, PA, USA.
Thompson S.M. et al., "Exploiting Telecommunications to Delivery Real Time Transport Information," Road Transport Information and Control, Conf. Publication No. 454, Apr. 21-23, 1998, pp. 59-63, IEE, U.K.
"The Challenge of VICS: The Dialog Between the Car and Road has Begun," Oct. 1, 1996, pp. 19-63, The Road Traffic Information Communication System Centre (VICS Centre), Tokyo, Japan.
Tonjes, R., "3d Reconstruction of Objects from Ariel Images Using a GIS," presented at ISPRS Workshops on "Theoretical and Practical Aspects of Surface Reconstructions and 3-D Object Extraction" Sep. 9-11, 1997, 8 pages, held in Haifa, Israel.
Levinson, D. et al., "Assessing the Benefits and C osts of Intelligent Transportation Systems: The Value of Advanced Traveler Information Systems," Publication UCB-ITS-PRR-99-20, California Path Program, Jul. 1999, Institute of Transportation Studies, University of California, Berkeley, CA, USA.
Adib Kanafani, "Towards a Technology Assessment of Highway Navigation and Route Guidance," Program on Advanced Technology for the Highway, Institute of Transportation Studies, University of California, Berkeley, Dec. 1987, PATH Working Paper UCB-ITS-PWP-87-6.
Answer, Affirmative Defenses, and Counterclaims by Defendant Westwood One, Inc., to Plaintiff Triangle Software, LLC's Complaint for Patent Infringement, Mar. 11, 2011.
Answer and Counterclaims of TomTom, Inc. to Plaintiff Triangle Software, LLC's Complaint for Patent Infringement, May 16, 2011.
Attachment A of Garmin's Preliminary Invalidity Contentions and Certificate of Service filed May 16, 2011 in *Triangle Software, LLC. v. Garmin International, Inc.* et al., Case No. 1: 10-cv-1457-CMH-TCB in the United States District Court for the Eastern District of Virginia, Alexandria Division, 6 pages.
Attachment B of Garmin's Preliminary Invalidity Contentions and Certificate of Service filed May 16, 2011 in *Triangle Software, LLC. v. Garmin International, Inc.* et al., Case No. 1: 10-cv-1457-CMH-TCB in the United States District Court for the Eastern District of Virginia, Alexandria Division, 618 pages.

(56) References Cited

OTHER PUBLICATIONS

Balke, K.N., "Advanced Technologies for Communicating with Motorists: A Synthesis of Human Factors and Traffic Management Issues," Report No. FFWA/TX-92/1232-8, May 1992, Texas Department Transportation, Austin, TX, USA, 62 pages.

Barnaby J. Feder, "Talking Deals; Big Partners in Technology," Technology, The New York Times, Sep. 3, 1987.

Brooks, et al., "Turn-by-Turn Displays versus Electronic Maps: An On-the-Road Comparision of Driver Glance Behavior," Technical Report, The University of Michigan, Transportation Research Institute (UMTRI), Jan. 1999.

Declaration Under 37 C.F.R. 1.131 and Source Code from U.S. Appl. No. 10/897,550, Oct. 27, 2008.

Fawcett, J., "Adaptive Routing for Road Traffic," IEEE Computer Graphics and Applications, May/Jun. 2000, pp. 46-53, IEEE, New York, NY, USA.

Garmin International, Inc.'s Answer and Counterclaims to Triangle Software, LLC's Complaint, Jun. 17, 2011.

Garmin's Preliminary Invalidity Contentions and Certificate of Service filed May 16, 2011 in *Triangle Software, LLC.* v. *Garmin International, Inc.* et al., Case No. 1: 10-cv-1457-CMH-TCB in the United States District Court for the Eastern District of Virginia, Alexandria Division, 46 pages.

Goldberg et al., "Computing the Shortest Path: A Search Meets Graph Theory," Proc. of the 16th Annual ACM-SIAM Sym. on Discrete Algorithms, Jan. 23-25, 2005. Vancouver, BC.

Goldberg et al., "Computing the Shortest Path: A Search Meets Graph Theory," Microsoft Research, Technical Report MSR-TR-2004 Mar. 24, 2003.

Gueziec, Andre, "3D Traffic Visualization in Real Time," ACM Siggraph Technical Sketches, Conference Abstracts and Applications, p. 144, Los Angeles, CA, Aug. 2001.

Hankey, et al., "In-Vehicle Information Systems Behavioral Model and Design Support: Final Report," Feb. 16, 2000, Publication No. 00-135, Research, Development, and Technology, Turner-Fairbank Highway Research Center, McLean, Virginia.

Preliminary Invalidity Contentions of Defendant TomTom, Inc., Certificate of Service and Exhibit A filed May 16, 2011 in *Triangle Software, LLC.* v. *Garmin International, Inc.* et al., Case No. 1: 10-cv-1457-CMH-TCB in the United States District Court for the Eastern District of Virginia, Alexandria Division, 354 pages.

Rillings, J.H., "Advanced Driver Information Systems," IEEE Transactions on Vehicular Techonology, Feb. 1991, vol. 40, No. 1, pp. 31-40, IEEE, New York, NY, USA.

Rockwell, Mark, "Telematics Speed Zone Ahead," Wireless Week, Jun. 15, 2004, Reed Business Information, http://www.wirelessweek.com.

Texas Transportation Institute, "2002 Urban Mobility Study: 220 Mobility Issues and Measures: The Effects of Incidents—Crashes and Vehicle Breakdowns" (2002).

User Guide of Tom Tom ONE; 2006.

Volkswagon Group of America, Inc.'s Answer and Counterclaim, Feb. 24, 2011.

WSI, "TrueView Interactive Training Manual, Showfx Student Guide," Print Date: Sep. 2004, Document Version: 4.3x. Link: http://apollo.lsc.vsc.edu/intranet/WSI_Showfx/training/970-TVSK-SG-43.pdf.

Yim et al., Travinfo. Field Operational Test Evaluation "Evaluation of TravInfo Field Operation Test" Apr. 25, 2000.

Yim et al., "TravInfo Field Operational Test Evaluation: Information Service Providers Customer Survey" (2000).

PCT Application No. PCT/US2004/23884, Search Report and Written Opinion mailed Jun. 17, 2005.

PCT Application No. PCT/US2011/48680, Search Report and Written Opinion mailed Feb. 7, 2012.

PCT Application No. PCT/US2011/51647, Search Report and Written Opinion mailed Feb. 2, 2012.

PCT Application No. PCT/US2011/60663, Search Report and Written Opinion mailed May 31, 2012.

PCT Application No. PCT/US2012/38702, Search Report and Written Opinion mailed Aug. 24, 2012.

EP Patent Application No. 11 825 897.9, Communication mailed May 3, 2013.

U.S. Appl. No. 10/379,967, Final Office Action mailed May 11, 2005.
U.S. Appl. No. 10/379,967, Office Action mailed Sep. 20, 2004.
U.S. Appl. No. 10/897,550, Office Action mailed Jun. 12, 2009.
U.S. Appl. No. 10/897,550, Office Action mailed Jan. 21, 2009.
U.S. Appl. No. 10/897,550, Office Action mailed Aug. 1, 2008.
U.S. Appl. No. 10/897,550, Office Action mailed Oct. 3, 2007.
U.S. Appl. No. 11/509,954, Office Action mailed Nov. 23, 2007.
U.S. Appl. No. 11/751,628, Office Action mailed Jan. 29, 2009.
U.S. Appl. No. 12/283,748, Office Action mailed Aug. 20, 2009.
U.S. Appl. No. 12/283,748, Office Action mailed Mar. 11, 2009.
U.S. Appl. No. 12/763,199, Final Office Action mailed Nov. 1, 2010.
U.S. Appl. No. 12/763,199, Office Action mailed Aug. 5, 2010.
U.S. Appl. No. 12/860,700, Office Action mailed Feb. 26, 2013.
U.S. Appl. No. 12/881,690, Office Action mailed Apr. 22, 2013.
U.S. Appl. No. 12/967,045, Final Office Action mailed Jun. 27, 2012.
U.S. Appl. No. 12/967,045, Office Action mailed Jul 18, 2011.
U.S. Appl. No. 13/296,108, Office Action mailed May 9, 2013.
U.S. Appl. No. 13/316,250, Office Action mailed Jan. 18, 2013.
U.S. Appl. No. 13/475,502, Office Action mailed Apr. 22, 2013.
U.S. Appl. No. 13/561,269, Office Action mailed Dec. 13, 2012.
U.S. Appl. No. 13/561,327, Office Action mailed Oct. 26, 2012.
U.S. Appl. No. 12/860,700, Final Office Action mailed Jun. 26, 2013.
U.S. Appl. No. 12/881,690, Final Office Action mailed Aug. 9, 2013.
U.S. Appl. No. 13/316,250, Final Office Action mailed Jun. 24, 2013.
U.S. Appl. No. 13/475,502, Final Office Action mailed Sep. 10, 2013.
U.S. Appl. No. 13/747,454, Office Action mailed Jun. 17, 2013.
U.S. Appl. No. 13/752,351, Office Action mailed Jul. 22, 2013.

* cited by examiner

CONTROLLING A THREE-DIMENSIONAL VIRTUAL BROADCAST PRESENTATION

CROSS-REFERENCE TO RELATED APPLICATIONS

The present application is related to U.S. patent application Ser. No. 11/302,418 filed Dec. 12, 2005 and entitled "Traffic Information Dissemination," the disclosure of which is incorporated herein by reference.

BACKGROUND OF THE INVENTION

1. Field of the Invention

The present invention generally relates to broadcast presentation technology. More specifically, the present invention relates to controlling a three-dimensional virtual broadcast presentation.

2. Description of the Related Art

Broadcast presentations such as traffic reports and weather forecasts generally include a series of maps and images referred to be a presenter can during the course of such presentations. The maps and images may be quite complex incorporating animations, three-dimensional graphics, and multimedia overlays. Transitions between the maps and images may have added effects as well.

These broadcast presentations are conventionally performed in a scripted manner. The series of maps and images referred to by the presenter are produced prior to the broadcast presentation and arranged in a fixed sequence much like a slide show. The presenter may have an ability to control progression or retrogression of the sequence, but is otherwise bound to the initially included material. As a result, the information included in the maps and images—at the time of presentation—is outdated. This outdated information can have a drastic impact on the accuracy of, for example, for traffic reports.

Existing broadcast presentation technology also lacks the ability for the presenter to interact with the maps and images during the broadcast presentation. The presenter is unable to spontaneously change a view of a particular map to investigate an area that was not a part of the original script.

There is, therefore, a need in the art for the broadcast of three-dimensional virtual presentations that can be referred to and manipulated by a user in real-time.

SUMMARY OF THE CLAIMED INVENTION

Embodiments of the present invention allow a presenter to change a view of a broadcast presentation and to interact with the broadcast presentation in real-time.

In a first claimed embodiment, a method for controlling a three-dimensional virtual broadcast presentation is disclosed. The method includes generating a three-dimensional virtual broadcast presentation based on dynamic information. A signal generated by a control device maneuvered by a presenter is received, the signal reflecting positional information of the control device. Positional information of the control device may be associated with motion or attitude of the control device. A view of the three-dimensional virtual broadcast presentation is manipulated in response to the received signal, the manipulation of the virtual broadcast presentation at least partially based on positional information of the control device.

In a second claimed embodiment, a system for controlling a three-dimensional virtual broadcast presentation is disclosed. The system includes a communications module stored in memory and executable by a processor to receive a signal generated by a control device maneuvered by a presenter, the signal reflecting positional information of the control device. The system also include a presentation rendering module stored in memory and executable by a processor to generate a three-dimensional virtual broadcast presentation based on dynamic information, and manipulate a view of the three-dimensional virtual broadcast presentation. The manipulation of the virtual broadcast presentation at least partially based on positional information of the control device.

A third claimed embodiment discloses a computer readable storage medium having a program embodied thereon. The program is executable by a processor to perform method for controlling a three-dimensional virtual broadcast presentation. The method includes generating a three-dimensional virtual broadcast presentation based on dynamic information; receiving a signal generated by a control device maneuvered by a presenter, the signal reflecting positional information of the control device; and manipulating a view of the three-dimensional virtual broadcast presentation in response to the received signal, the manipulation of the virtual broadcast presentation at least partially based on positional information of the control device.

DETAILED DESCRIPTION

The present invention provides for control of a three-dimensional virtual broadcast presentation. The three-dimensional virtual broadcast presentation may include maps and images rendered in a three-dimensional manner and that can be referred to in real-time by a presenter during the broadcast presentation. The presenter may maneuver a handheld control device to manipulate a view of the three-dimensional virtual broadcast presentation. The presenter may also select interactive elements included in the three-dimensional virtual broadcast presentation using the handheld control device.

Figure 1A:
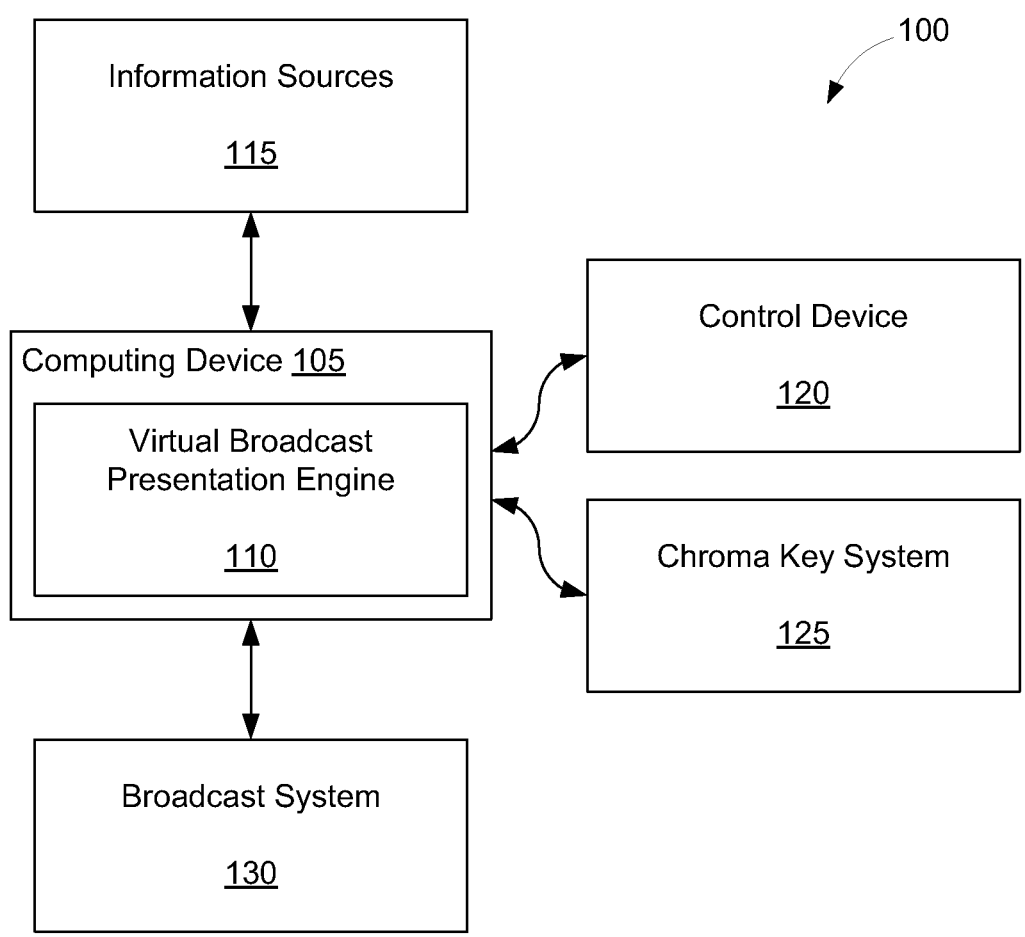
FIG. 1A is a block diagram illustrating an environment for the broadcast of three-dimensional virtual presentations that can be referred to and manipulated by a user in real-time.

Referring now to FIG. 1A, a block diagram of an environment 100 for the broadcast of three-dimensional virtual presentations that can be referred to and manipulated by a user in real-time is shown. The environment 100 of FIG. 1A includes a computing device 105 having a virtual broadcast presentation engine 110. The computing device 105 of FIG. 1A is in communication with information sources 115, a control device 120, a chroma key system 125, and a broadcast system 130. While FIG. 1A illustrates one particular environment 100 for the broadcast of a three-dimensional virtual presentation and including certain elements, alternative embodiments may be implemented that utilize differing elements than those disclosed in FIG. 1A (or combinations of the same), but that otherwise fall within the scope and spirit of the present invention.

The computing device 105 and the virtual broadcast presentation engine 110 generate a composite presentation that includes a three-dimensional virtual broadcast presentation and possibly footage of a presenter. The composite presentation may be generated using information obtained in real-time (or near real-time) from the information sources 115 and the chroma key system 125 as described in further detail below. The virtual broadcast presentation engine 110 is, in particular, discussed with respect to FIG. 2A. The computing device 105 may include various components (not depicted) such as one or more of communications interfaces, a processor, memory, storage, and any number of buses providing communication therebetween. The processor may execute instructions implemented through computing modules or engines while the memory and storage may both permanently or temporarily store data including the aforementioned modules and engines.

The information sources 115 may be provided by various organizations and in a variety of forms. The information sources 115 may include data sources related to traffic data such as traffic flow and as described in U.S. patent application Ser. No. 11/302,418 or weather data such as forecasts. The information sources 115 may also include data sources related to election results, newsworthy events or incidents, school closings, and other information that may be featured on a three-dimensional virtual broadcast presentation. The information sources 115 may require subscription or authentication for access and may be accessible via Telnet, FTP, or web services protocols. Information may be received from information sources 115 in real-time or near real-time to allow for generation of an equally real-time or near real-time presentation. That presentation may, in turn, be manipulated in real-time.

In an embodiment of the present invention utilizing traffic data specific to the San Francisco Bay area, the information sources 115 may include one or more of the 511.org system (a collaboration of public agencies including the California Highway Patrol, Metropolitan Transportation Commission, and CALTRANS), the California Highway Patrol (CHP) World Wide Web server, the PeMS system at the University of California at Berkeley, various public event listings, or a publicly or privately accessible user input mechanism. For weather data, the information sources 115 may include the National Weather Service among other weather information sources. Other data sources or alternative types of data sources (e.g., non-traffic and non-weather related sources) may be incorporated and utilized in various embodiments of the present invention.

Control device 120 may include a wireless handheld controller. The control device 120 may be in communication with the computing device 105 via a Bluetooth, WiFi, or other wireless connection. The control device 120 may sense its own motion and/or attitude. Attitude of the control device 120 describes the inclination of the principal axes of the control device 120 relative to the direction of the Earth's gravitational pull. The control device 120 may include a three-axis accelerometer that can sense orientation or changes in orientation of the control device 120 relative to the direction of the Earth's gravitational pull. The control device 120 may also be capable of sensing its own motion or attitude by detecting illumination emitted by positioned emitters. As the presenter maneuvers the control device 120 by turning, rotating, tilting, or twisting about various axes, the control device 120 generates a signal based at least partially on positional information of the control device 120. The positional information may be associated with the motion of the control device 120 or the attitude of the control device 120. A magnitude of such maneuvers of the control device 120 by the presenter may be included in the signal as described further herein. Stability control may be implemented in some embodiments of the control device 120 such that small and often unintentional motions of the control device 120 are smoothed or ignored.

The control device 120 may include other components such as buttons, switches, or triggers. Actuation of these other components may be a partial basis for any signal generated by the control device 120. Actuation of these other components may be combined with certain motions or attitudes of the control device yielding a wider variety of signal possibilities. For example, actuation of various buttons, switches, or triggers may control certain zooming functions, open or close pop-up windows in the three-dimensional virtual broadcast presentation, or obtain a default orientation of the three-dimensional virtual broadcast presentation (e.g., align the three-dimensional virtual broadcast presentation to face north). Additionally, a signal associated with positional information of the control device 120 may be sent by the control device 120 to the computing device 105 only when a particular button is depressed, in accordance with exemplary embodiments. This may be implemented as a safely feature so that the presenter cannot accidentally or automatically affect the three-dimensional virtual broadcast presentation.

The control device 120 may include various portable devices capable of detecting positional information. For example, the control device 120 may be an iTouch™ or iPhone™, both available from Apple Inc., of Cupertino, Calif. The control device 120 may also be a Wii™ Remote (sometimes referred to as a Wiimote) available from Nintendo Co., Ltd., of Kyoto, Japan. A control device similar to the Wii™ Remote is described in greater detail in U.S. patent application Ser. No. 11/532,328 filed Sep. 15, 2006 and entitled "Video Game System with Wireless Modular Handheld Controller," the disclosure of which is incorporated herein by reference.

Figure 1B:
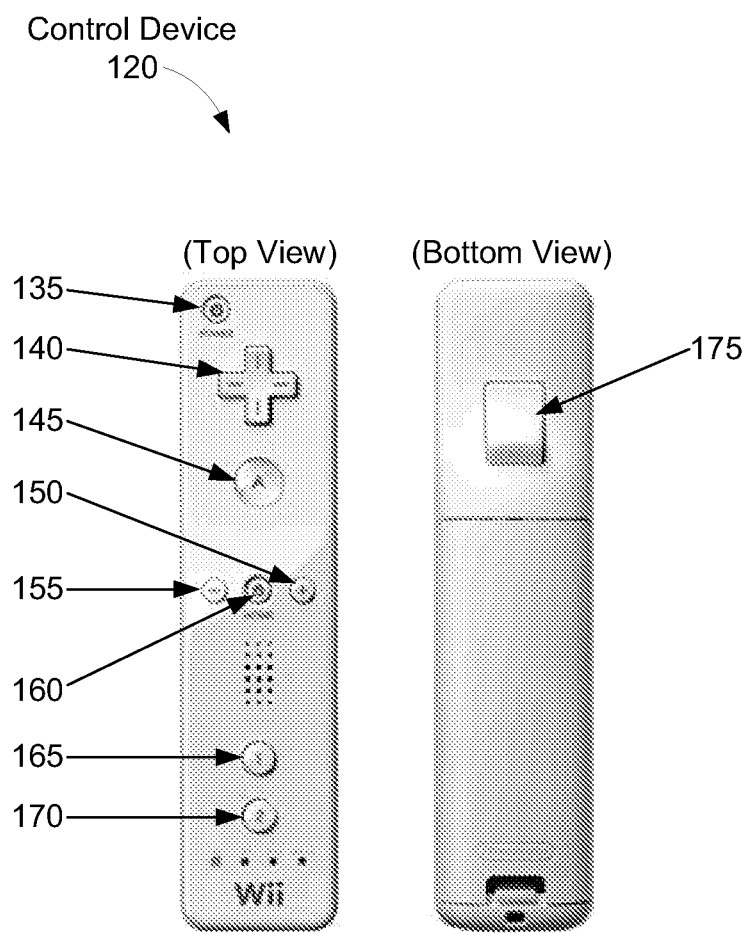
FIG. 1B illustrates an exemplary control device as referenced in FIG. 1A.

FIG. 1B illustrates an exemplary control device 120. Other devices may be used as the control device 120 in the context of the present invention. Signals may be sent by the control device 120 that correspond to positional information of the control device 120, and to actuation of buttons 135-170 and trigger 175. These signals may be configured to instruct the computing device 105 and/or the virtual broadcast presentation engine 110 to control various aspects of the three-dimensional virtual broadcast presentation. Such configuration of the signals may be customized for a specific application or to suit preferences of a specific presenter.

Actuation of the button 135 may turn on or turn off the control device 120 or another component of the environment 100. Various actuations of the directional button 140 may change a focus of the three-dimensional virtual broadcast presentation to different points of interest within the presentation. Actuation of the button 145 may control whether signals are sent that correspond to maneuvers of the control device 120. For example, signals corresponding to maneuvers of the control device 120 may be sent to the computing device 105 only when the button 145 is depressed by the presenter. Actuation of the buttons 150 and 155 may result a zoom-in or zoom-out of a view of the three-dimensional virtual broadcast presentation. Actuation of the button 160 may result in the three-dimensional virtual broadcast presentation returning to a default orientation (e.g., the three-dimensional virtual broadcast presentation being aligned to face north). Actuation of the button 165 may result in selection of interactive elements included in the three-dimensional virtual broadcast presentation. Actuation of the button 170 may cause certain elements of the three-dimensional virtual broadcast presentation to be hidden such as pop-up windows. Actuation of the trigger 175 may effectuate similar functions as actuation of the button 145.

Chroma key system 125 may be used to capture footage of the presenter that can be used as part of the composite presentation generated by the computing device 105. The chroma key system 125 may provide the presenter with a preview of the composite presentation to allow the presenter to appear as though he or she is naturally interacting with the three-dimensional virtual broadcast presentation.

Chroma key systems are well known in the art. To illustrate the basic principles of such a system, consider a weather forecast broadcast. The presenter appears to be standing in front of a large weather map. In the television studio, however, the weather map is actually a large 'blue screen.' The presenter stands in front of the 'blue screen' and the weather map is added to those parts of the image where the color is blue.

The chroma key system 125 may include a blue or green screen, a monitor meant only for viewing by the presenter and that shows the presenter 'overlaid' on the three-dimensional virtual broadcast presentation, and a camera that captures video footage of the presenter in front of the screen. Various components may be included in the chroma key system 125 depending on the particular implementation of the same.

The broadcast system 130 disseminates the composite presentation to viewers. Dissemination may occur via radio waves such as UHF or VHF, cable, satellite, or the World Wide Web. Hardware and software necessary to effectuate a broadcast may be included in the broadcast system 130 and are generally known to those skilled in the broadcasting art.

Figure 2A:
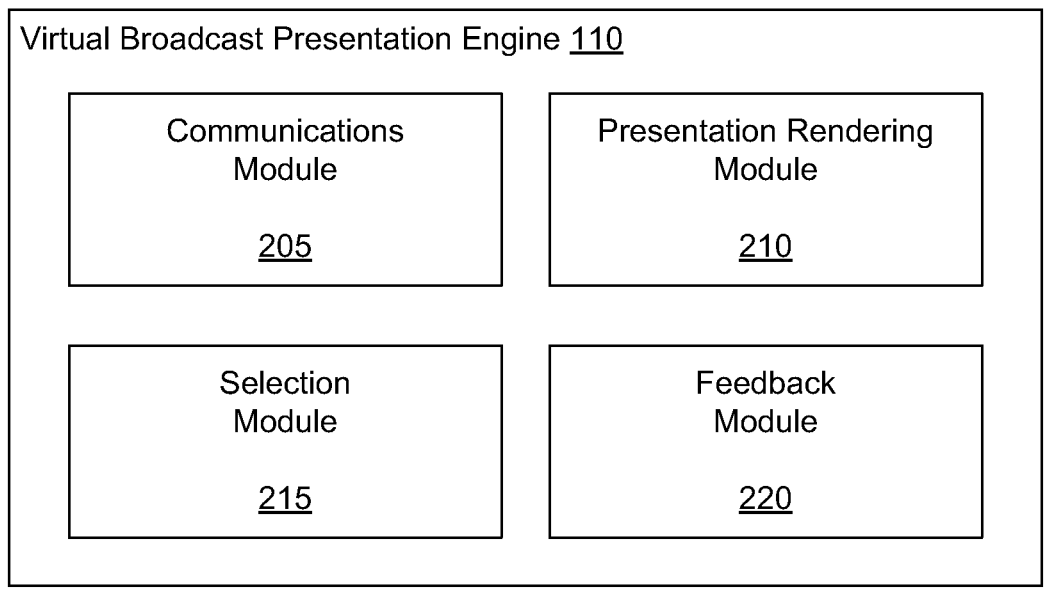
FIG. 2A is a block diagram of an exemplary virtual broadcast presentation engine.

FIG. 2A is a block diagram of the virtual broadcast presentation engine 110. The virtual broadcast presentation engine 110 of FIG. 2A includes a communications module 205, a presentation rendering module 210, a selection module 215, and a feedback module 220. The broadcast engine 110 and its constituent modules may be stored in memory and executed by a processing device to effectuate the functionality corresponding thereto. The virtual broadcast presentation engine 110 may be composed of more or less modules (or combinations of the same) and still fall within the scope of the present invention. For example, the functionality of the selection module 215 and the functionality of the feedback module 220 may be combined into a single module.

Execution of the communications module 205 allows for receipt of a signal generated by the control device 120, which may be based at least partially on the positional information of the control device 120 as maneuvered by the presenter. The signal may additionally be based on—in part or in whole—the actuation of other components included in the control device 120 such as buttons, switches, or triggers.

In addition to the signal generated by the control device 120, execution of the communications module 205 may also allow for receipt of dynamic information from the information sources 115. This dynamic information may be used by other modules for generating, manipulating, and interacting with the three-dimensional virtual broadcast presentation.

Figure 2B:
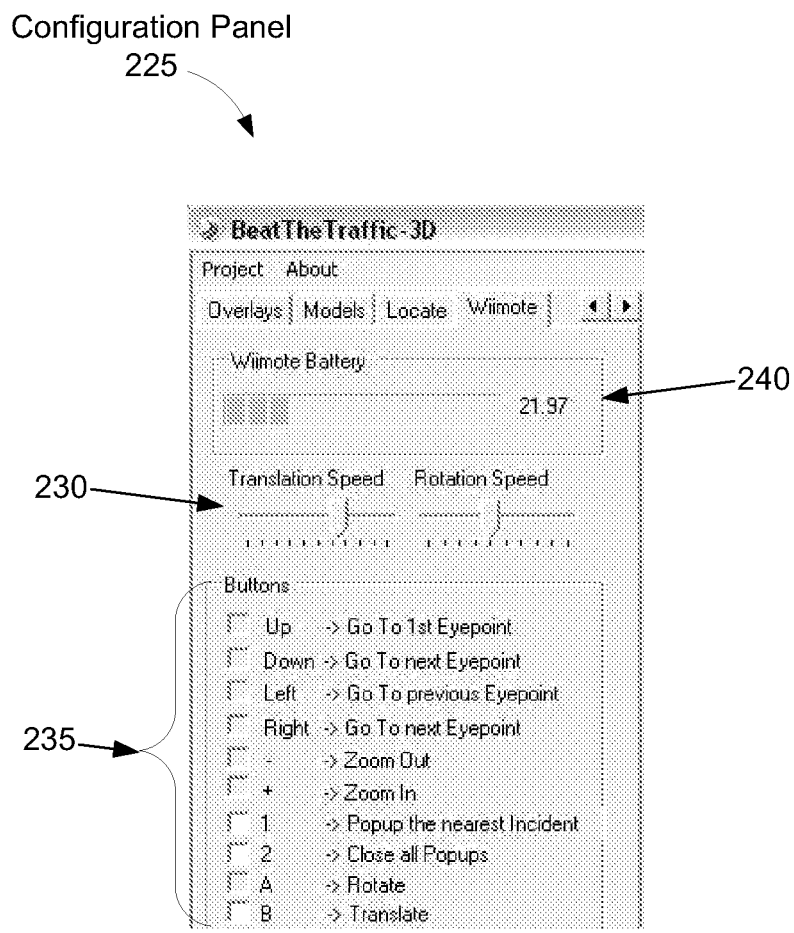
FIG. 2B illustrates an exemplary configuration panel as may be launched through execution of the virtual broadcast presentation engine of FIG. 2A.

The communications module 205 may also allow the presenter or other users to control certain aspects of the control device 120 such as how signals received from the control device 120 are interpreted by the modules of the virtual broadcast presentation engine 110. FIG. 2B illustrates an exemplary configuration panel 225. The configuration panel 225 may be accessed and manipulated by the presenter or the other users by use of components associated with the computing device 105. These components (not depicted) may include a monitor, a keyboard, a mouse, and other various peripheral devices.

As depicted, the configuration panel 225 includes sliders 230 and check boxes 235. The sliders 230 may be used to adjust sensitivity to various maneuvers of the control device 120 by the presenter. The check boxes 235 may be used to activate or deactivate various buttons included in the control device 125. The configuration panel 225 may also include status information about the control device 120. For example, as depicted, the configuration panel 225 includes a power meter 240 that may indicate a power level of batteries included in the control device 120.

Referring again to FIG. 2A, execution of the presentation rendering module 210 allows for the generation of a three-dimensional virtual broadcast presentation based on the dynamic information received through execution of the communications module 205. The dynamic information may include traffic information, weather information, election results, newsworthy events or incidents, school closings, or other information that may be featured on a three-dimensional virtual broadcast presentation.

Execution of the presentation rendering module 210 may also allow for manipulation of a view of the three-dimensional virtual broadcast presentation in response to the signal received by the communications module 205 from the control device 120. Manipulating the view of the presentation may include one or more of zooming into, panning across, rotating, or tilting the three-dimensional virtual broadcast presentation. Signals corresponding to various motions or attitudes of the control device 120 may be assigned to various other manipulations of the three-dimensional virtual broadcast presentation. For example, actuation of a trigger included in the control device 120 may affect zoom speed, whereas a certain motion or attitude of the control device 120 may affect zoom direction. Furthermore, the magnitude of the maneuvers of the control device 120 by the presenter may be included in the signal received by the communications module 205 to adjust a speed at which the view of the presentation is manipulated.

Execution of the selection module 215 allows for selection of an interactive element included in the three-dimensional virtual broadcast presentation in response to the received signal. The interactive element may represent a traffic alert. For example, if road construction is taking place at a given intersection of two streets, an icon indicative of road construction may be placed in the three-dimensional virtual broadcast presentation at a position that corresponds to that given intersection. Execution of the selection module 215 may also select the interactive element when the interactive element is positioned near the center of the three-dimensional virtual broadcast presentation.

Selecting the interactive element may cause one of a variety of responses from the three-dimensional virtual broadcast presentation. For example, if the interactive element corresponds to a traffic camera, selecting the interactive element may cause a live camera view to appear within the three-dimensional virtual broadcast presentation.

Execution of the feedback module 220 provides feedback to the presenter to inform the presenter that a given interactive element is selectable. For example, the interactive element may only be selectable in certain regions of the three-dimensional virtual broadcast presentation, such as the center. When the interactive element enters or leaves the center of the three-dimensional virtual broadcast presentation, the presenter may be informed via feedback. The feedback may include highlighting of the interactive element. To avoid distracting or otherwise undesirable imagery such as a cursor being included in the three-dimensional virtual broadcast presentation, non-visible feedback may be invoked. Examples of non-visible feedback include a vibration of the control device or an audible tone. Visible feedback mechanisms may be employed only on the monitor of the chroma key system 125, which is meant only for the presenter, while the composite presentation used by the broadcast system 130 may not include the visible feedback mechanism.

Execution of the virtual broadcast presentation engine 110 may output the three-dimensional virtual broadcast presentation to other components of the computing device 105 for generation of the composite presentation. Accordingly, the computing device 105 may output the composite presentation to the broadcast system 130 for dissemination to the views.

Figure 3:
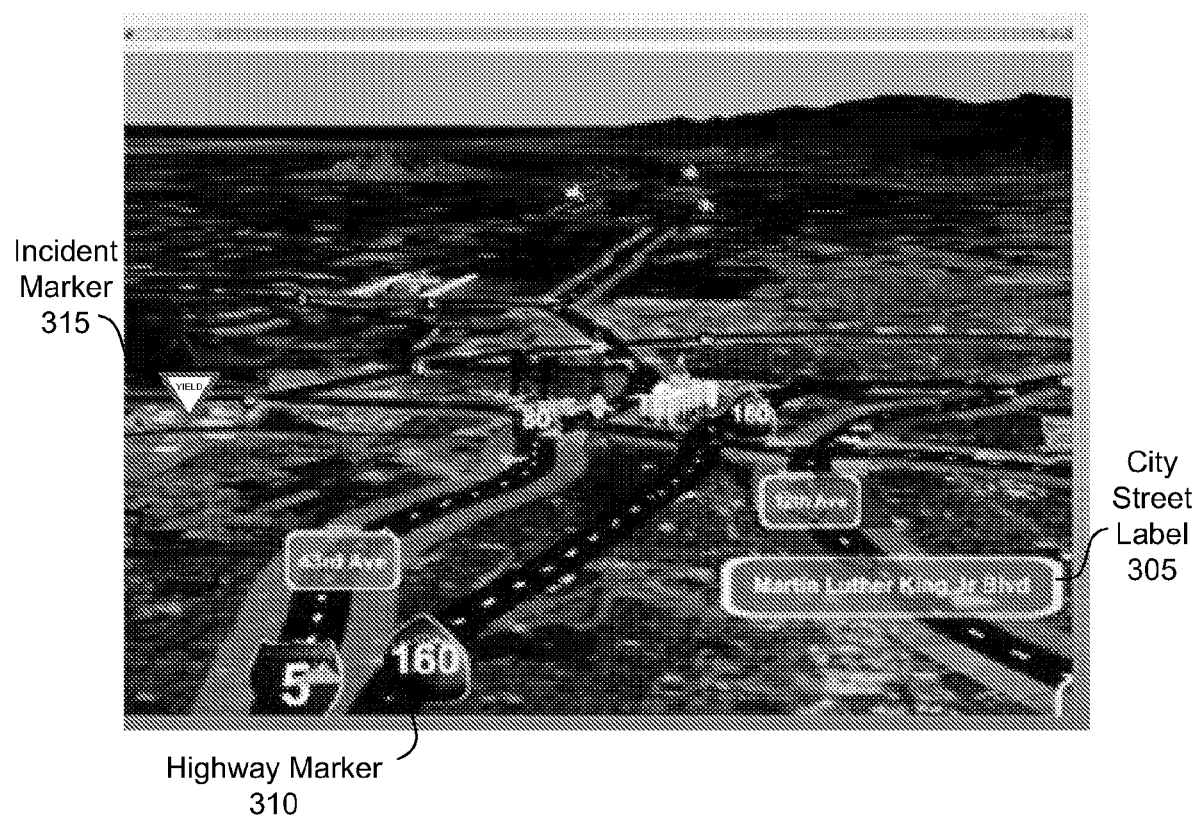
FIG. 3 illustrates an exemplary three-dimensional virtual broadcast presentation.

FIG. 3 illustrates an exemplary three-dimensional virtual broadcast presentation 300. The presentation 300 of FIG. 3 includes traffic information. The principles described herein with respect to traffic are equally applicable to embodiments of the present invention that include weather information, election results, newsworthy events or incidents, school closings, or other information that may be featured on a three-dimensional virtual broadcast presentation. The presentation 300 may be generated and manipulated by execution of the presentation rendering module 210 in real-time. Presentation 300 may include satellite images of a given area with an animated road traffic report. A detailed description of animated road traffic reports may be found in U.S. patent application Ser. No. 11/302,418, the disclosure of which has been previously incorporated by reference.

Satellite images may be manipulated by execution of the presentation rendering module 210 to aid in generating three-dimensional information. For example, two-dimensional satellite images may be processed in the context of other geographical information (e.g., topographical information) to generate a three-dimensional satellite image that reflects information along an x-, y-, and z-axis as illustrated in presentation 300. The textured three-dimensional representation of landscape of the particular urban area aligns with and provides the three-dimensional coordinates for the road ways that may be animated and overlain on the satellite images.

The presentation 300 may also include a variety of markers such as city street labels 305, exit labels, nick-named sections of highways, or city streets. These markers may be readily recognizable, such as a highway marker 310 resembling a California state highway sign with the appropriate highway number applied to the sign. Presentation 300 may include markers or icons that correspond to the location of traffic incidents, road construction, and traffic cameras such as incident marker 315. Some or all of these markers may be interactive elements of the three-dimensional virtual broadcast presentation 300. Accordingly, the interactive elements may be selected by the presenter using the control device 120. When an interactive element is selected, additional information related to that interactive element may be displayed within the presentation 300. In one example, an interactive element marking a traffic incident may be selected resulting in detailed textual information describing that traffic incident being displayed.

A view of the presentation 300 may be manipulated to give the effect of 'flying' through the three-dimensional virtual representation of the urban area by a combination of zooming, panning, tilting, and/or rotating the view. For example, as the presenter rotates the control device 120, the control device 120 generates a corresponding signal that is received in conjunction with execution of the communications module 205. In turn, the presentation rendering module 210 is executed to rotate the presentation 300 a corresponding amount as the presenter rotated the control device 120. This correspondence of the presentation 300 to manipulation of the control device 120 gives the presenter the sensation of directly controlling the presentation 300. Such manipulation of the view may also be used in selecting interactive elements. For example, if a particular interactive element may be selected only when near the center of the presentation 300, the presenter may cause the view to be manipulated such that that particular interactive element is centered and therefore selectable.

Figure 4:
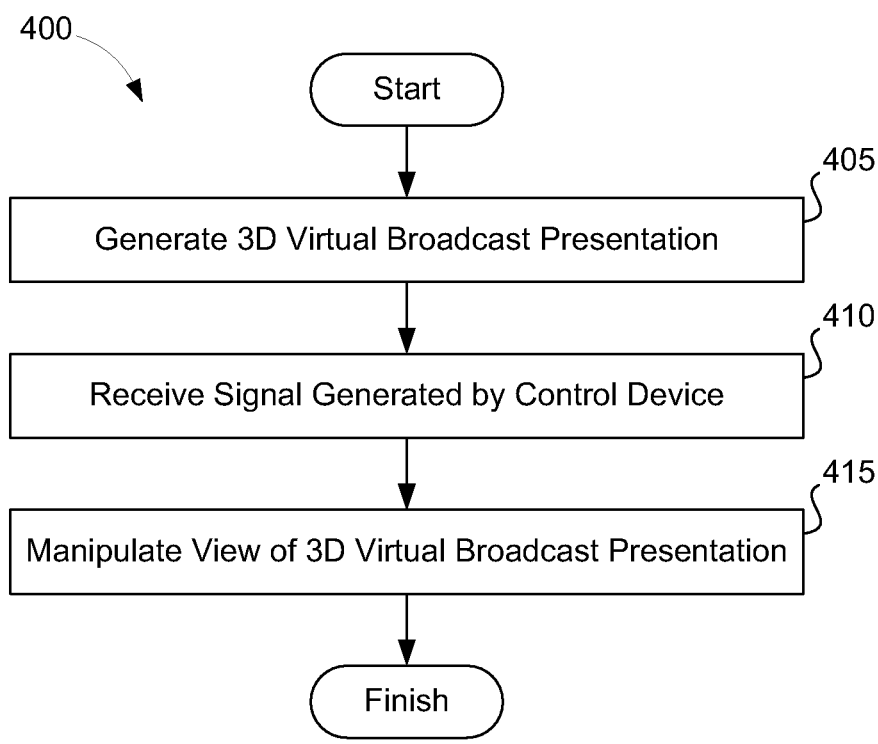
FIG. 4 is a flowchart illustrating an exemplary method for controlling a three-dimensional virtual broadcast presentation.

FIG. 4 is a flowchart illustrating an exemplary method 400 for controlling a three-dimensional virtual broadcast presentation. The steps of method 400 may be performed in varying orders. Steps may be added or subtracted from the method 400 and still fall within the scope of the present invention.

In step 405, a three-dimensional (3D), real-time, virtual broadcast presentation is generated. The presentation may be based on dynamic information. Execution of the presentation rendering module 210 may perform step 405. The dynamic information may include real-time traffic information or real-time weather information and be received in conjunction with execution of the communications module 205 from the information sources 115.

In step 410, a signal may be received that is generated by the control device 120 maneuvered by a presenter. Step 410 may be performed by execution of the communications module 205. The signal may be based at least partially on positional information of the control device 120. The signal may also be based at least partially on actuation of other components such as buttons, switches, or triggers of the control device 120. Receipt of the signal in step 410 allows for real-time manipulation of the presentation in step 415.

In step 415, a view of the three-dimensional virtual broadcast presentation is manipulated in real-time and in response to the signal received in step 410. Execution of the presentation rendering module 210 may perform step 415. Real-time manipulation of presentation and various views thereof may include one or more of zooming into, panning across, tilting, or rotating the three-dimensional virtual broadcast presentation.

Any number of additional and/or optional steps that are not otherwise depicted may be included in method 400. These steps may include one or more of an interactive element included in the three-dimensional virtual broadcast presentation being selected using the control device 120 or feedback being provided to the presenter to inform the presenter that an interactive element is selectable.

It is noteworthy that any hardware platform suitable for performing the processing described herein is suitable for use with the invention. Computer-readable storage media refer to any medium or media that participate in providing instructions to a central processing unit (CPU) for execution. Such media can take forms, including, but not limited to, non-volatile and volatile media such as optical or magnetic disks and dynamic memory, respectively. Common forms of computer-readable storage media include a floppy disk, a flexible disk, a hard disk, magnetic tape, any other magnetic medium, a CD-ROM disk, digital video disk (DVD), any other optical medium, RAM, PROM, EPROM, a FLASHEPROM, any other memory chip or cartridge.

Various forms of transmission media may be involved in carrying one or more sequences of one or more instructions to a CPU for execution. A bus carries the data to system RAM, from which a CPU retrieves and executes the instructions. The instructions received by system RAM can optionally be stored on a fixed disk either before or after execution by a CPU.

While various embodiments have been described above, it should be understood that they have been presented by way of example only, and not limitation. The descriptions are not intended to limit the scope of the invention to the particular forms set forth herein. Thus, the breadth and scope of a preferred embodiment should not be limited by any of the above-described exemplary embodiments. It should be understood that the above description is illustrative and not restrictive. To the contrary, the present descriptions are intended to cover such alternatives, modifications, and equivalents as may be included within the spirit and scope of the invention as defined by the appended claims and otherwise appreciated by one of ordinary skill in the art. The scope of the invention should, therefore, be determined not with reference to the above description, but instead should be determined with reference to the appended claims along with their full scope of equivalents.

What is claimed is:

1. A method for controlling a three-dimensional virtual broadcast presentation, the method comprising:
   receiving dynamic information at a communications interface from a communications network;
   executing instructions stored in memory, wherein execution of the instructions by a processor:
      generates a three-dimensional virtual broadcast presentation based on the dynamic information, wherein the dynamic information includes two-dimensional satellite images of a geographic area and wherein generation of the three-dimensional virtual broadcast includes processing the two-dimensional satellite images and associated contextual information regarding the geographic area to create a three-dimensional satellite image,
      generates an interactive element in the three-dimensional virtual broadcast presentation, wherein the interactive element is selectable only when it is in the center of the three-dimensional virtual broadcast presentation,
      manipulates a view of the three-dimensional virtual broadcast presentation in response to a received representation of a signal generated by a control device maneuvered by a presenter, wherein the interactive element is centered in the three-dimensional virtual broadcast presentation, the manipulation of the virtual broadcast presentation at least partially based on positional information of the control device,
      allows for selection of the interactive element using the control device in response to feedback from the control device; and
   displays additional information related to the interactive element within the three-dimensional broadcast presentation.

2. The method of claim 1, wherein positional information of the control device is associated with motion of the control device.

3. The method of claim 1, wherein positional information of the control device is associated with attitude of the control device.

4. The method of claim 1, wherein selection of the interactive element is made using the control device.

5. The method of claim 4, wherein the interactive element includes a traffic alert.

6. The method of claim 4, wherein a live camera view appears within the three-dimensional virtual broadcast presentation, the live camera view appearing in response to the selection of the interactive element.

7. The method of claim 6, wherein the live camera view corresponds to a location on the three-dimensional virtual broadcast presentation.

8. The method of claim 1, wherein the dynamic information includes weather information.

9. The method of claim 1, wherein manipulating the view includes zooming into the three-dimensional virtual broadcast presentation.

10. The method of claim 1, wherein manipulating the view includes panning across the three-dimensional virtual broadcast presentation.

11. The method of claim 1, wherein the three-dimensional satellite image includes three-dimensional coordinates for one or more locations.

12. A system for controlling a three-dimensional virtual broadcast presentation, the system comprising:
   a server including a memory and a processor, and wherein the processor executes instructions stored in the memory of the server, the instructions executable by the processor to:
      generate a three-dimensional virtual broadcast presentation based on dynamic information, wherein the dynamic information includes two-dimensional satellite images of a geographic area and wherein generation of the three-dimensional virtual broadcast includes processing the two-dimensional satellite images and associated contextual information regarding the geographic area to create a three-dimensional satellite image,
      generate an interactive element in the three-dimensional virtual broadcast presentation, wherein the interactive element is selectable only when it is in the center of the three-dimensional virtual broadcast presentation, and
      manipulate a view of the three-dimensional virtual broadcast presentation in response to a received representation of a signal generated by a control device maneuvered by a presenter by zooming into or panning across the three-dimensional virtual broadcast presentation, the manipulation of the virtual broadcast presentation at least partially based on positional information of the control device.

13. The system of claim 12, wherein positional information of the control device is associated with motion of the control device.

14. The system of claim 12, wherein positional information of the control device is associated with attitude of the control device.

15. The system of claim 12, further comprising a selection module stored in memory and executable by a processor to select the interactive element included in the three-dimensional virtual broadcast presentation in response to the received signal.

16. The system of claim 12, further comprising a feedback module stored in memory and executable by a processor to provide feedback to inform the presenter that the interactive element is selectable.

17. The system of claim 12, wherein the three-dimensional satellite image includes three-dimensional coordinates for one or more locations.

18. A non-transitory computer-readable storage medium having a program embodied thereon, the program executable by a processor to perform method for controlling a three-dimensional virtual broadcast presentation, the method comprising:
   generating a three-dimensional virtual broadcast presentation based on dynamic information, wherein the dynamic information includes two-dimensional satellite images of a geographic area and wherein generation of the three-dimensional virtual broadcast includes processing the two-dimensional satellite images and associated contextual information regarding the geographic area to create a three-dimensional satellite image;

generating an interactive element in the three-dimensional virtual broadcast presentation, wherein the interactive element is selectable only when it is in the center of the three-dimensional virtual broadcast presentation;

manipulating a view of the three-dimensional virtual broadcast presentation in response to a received representation of a signal generated by a control device maneuvered by a presenter, wherein the interactive element is centered in the three-dimensional virtual broadcast presentation, the manipulation of the virtual broadcast presentation at least partially based on positional information of the control device;

allowing for selection of the interactive element using the control device in response to feedback from the control device; and displaying additional information related to the interactive element within the three-dimensional broadcast presentation.

19. The non-transitory computer-readable storage medium of claim 18, wherein the three-dimensional satellite image includes three-dimensional coordinates for one or more locations.

* * * * *